(12) United States Patent
Zielke et al.

(10) Patent No.: US 8,380,356 B1
(45) Date of Patent: Feb. 19, 2013

(54) SEEDER DOWNFORCE SECTION CONTROL

(75) Inventors: Roger R. Zielke, Huxley, IA (US); William Cannon, Ames, IA (US)

(73) Assignee: AG Leader Technology, Ames, IA (US)

( * ) Notice: Subject to any disclaimer, the term of this patent is extended or adjusted under 35 U.S.C. 154(b) by 0 days.

(21) Appl. No.: 13/494,557

(22) Filed: Jun. 12, 2012

(51) Int. Cl.
*G06F 19/00* (2011.01)
(52) U.S. Cl. .......................... 700/284; 111/34; 221/211
(58) Field of Classification Search .................. 700/284; 221/211, 278; 111/34, 77, 174, 177, 183, 111/182, 200, 903; 701/50, 466
See application file for complete search history.

(56) References Cited

U.S. PATENT DOCUMENTS

| 4,616,712 | A | * | 10/1986 | Jorgensen | 172/6 |
|---|---|---|---|---|---|
| 5,687,798 | A | * | 11/1997 | Henry et al. | 172/311 |
| 5,996,516 | A | * | 12/1999 | Benneweis et al. | 111/176 |
| 6,003,455 | A | * | 12/1999 | Flamme et al. | 111/200 |
| 6,460,623 | B1 | * | 10/2002 | Knussman et al. | 172/4 |
| 6,505,569 | B1 | * | 1/2003 | Richard | 111/174 |
| 6,701,857 | B1 | * | 3/2004 | Jensen et al. | 111/200 |
| 7,938,074 | B2 | * | 5/2011 | Liu | 111/200 |
| 2010/0010667 | A1 | * | 1/2010 | Sauder et al. | 700/231 |
| 2010/0198529 | A1 | | 8/2010 | Sauder et al. | |
| 2012/0060730 | A1 | | 3/2012 | Bassett | |

FOREIGN PATENT DOCUMENTS

EP     0 372 901 A2     6/1990

* cited by examiner

*Primary Examiner* — Kidest Bahta
(74) *Attorney, Agent, or Firm* — McKee, Voorhees & Sease, P.L.C.

(57) ABSTRACT

A control system for a seeder implement with a plurality of row units grouped into one or more sections, is provided. The control system includes an intelligent control, a plurality of down force sensors electrically connected to the intelligent control, each of the one or more sections having at least one down force sensor associated therewith. The system further includes a plurality of down force actuators electrically connected to the intelligent control, each of the row units associated with at least one of the plurality of down force actuators. The intelligent control is configured to determine whether each of the one or more sections is in a plant zone or a no plant zone and to control down force applied by the plurality of down force actuators differently when one or more of the plurality of sections is in a no plant zone.

27 Claims, 4 Drawing Sheets

SEEDER DOWNFORCE SECTION CONTROL

FIELD OF THE INVENTION

The present invention relates to seeder implements or planters. More particular, the present invention relates to a seeder downforce section control for a planter.

BACKGROUND OF THE INVENTION

Anyone familiar with seeder implements knows seeder row units do not have enough weight to consistently penetrate the soil to the intended planting depth. Down force actuators, such as mechanical springs, air bags or hydraulic cylinders overcome this limitation by transferring weight from the frame of the implement to the row unit.

Original actuators could not be controlled on-the-go. Now on-the-go down force actuator control systems are commonplace. Some embodiments are disclosed in EP 0372901 and U.S. Pat. No. 6,701,857. A sensor is used to measure how hard the row unit is pushing against the soil. If the row unit is not pushing against the soil, meaning planting is too shallow, the control system commands the down force actuator to apply more down force to the row unit. If the row unit is pushing against the soil too hard, the control system commands the down force actuator to remove down force.

On-the-go down force control systems usually have two or more rows instrumented with down force sensors per channel or section of control. Multiple sensors per section work well with prior art down force controllers as long as all sensed rows are in a part of the field that requires planting. In practice, sections of down force control occasionally span across areas of "no plant zones" and "plant zones." Common examples are wide seeders in odd shaped fields or fields with grassed waterways.

What is needed is a control system that applies the correct down force on rows in a control section(s) spanning across no plant and plant zones. The problem is that existing down force control systems treat down force sensors in no plant and plant zones the same. The wrong down force gets applied to rows over the plant zone when the no plant zone soil is drastically different than the plant zone soil. For example, the system will apply too much down force on rows over a plant zone soft soil when one or more of the down force sensors is in a no plant zone, like a waterway, are over hard soil. The control system will apply more down force to all rows in that section to compensate for the one row that is sensing hard soil in the no plant zone. One example of such a system is disclosed in U.S. patent application 2010/0198529.

What is needed is a down force control system with improved control functions.

SUMMARY OF THE INVENTION

Therefore, it is a primary object, feature, or advantage of the present invention to improve over the state of the art.

It is another object, feature, or advantage of the present invention to provide a seeder implement with improved downforce control.

Yet another object, feature, or advantage of the present invention is to provide for down force control in a seeder implement which distinguishes between plant zones and no plant zones.

A still further object, feature, or advantage of the present invention is to provide for down force control in a seeder implement which excludes down force sensors that are spatially in a no plant zone from being used by a logic routine used to command down force actuators.

Another object, feature, or advantage of the present invention is to provide for down force control in a seeder implement which allows for suspending closed loop control whenever any part of a section of the implement is spatially in a no plant zone.

Yet another object, feature, or advantage of the present invention is to provide for down force control in a seeder implement which allows for holding down force actuator at its last down force adjustment when a section of the implement is spatially in a no plant zone.

A further object, feature, or advantage of the present invention is to provide for down force control in a seeder implement which allows for removing all supplemental downforce applied by a downforce actuator when a section of the implement is spatially in a no plant zone.

One or more of these and/or other objects, features, or advantages of the present invention will become apparent from the specification and claims that follow. No single embodiment of the present invention need exhibit all of these objects, features, or advantages. Different embodiments of the present invention may provide different objects, features, and advantages. Thus, the present invention is not to be limited to or by these objects, features, or advantages.

According to one aspect of the invention, a control system for a seeder implement with a plurality of row units is provided grouped into a one or more sections, is provided. The control system includes an intelligent control, a plurality of down force sensors operatively connected to the intelligent control, each of the one or more sections having at least one down force sensor associated therewith. The system further includes a plurality of down force actuators operatively connected to the intelligent control, each of the row units associated with at least one of the plurality of down force actuators. The intelligent control is configured to determine whether each of the one or more sections is in a plant zone or a no plant zone and to control down force applied by the plurality of down force actuators differently when one or more of the plurality of sections is in a no plant zone.

According to another aspect of the invention, a seeder implement is provided. The seeder implement includes a plurality of row units, at least one section, with each of the at least one section containing a subset of the plurality of row units. The seeder implement further includes a down force actuator associated with each of the plurality of row units and at least one down force sensor associated with each of the at least one section. An intelligent control is operatively connected to each down force actuator and each down force sensor, the intelligent control configured to determine whether each section is in a plant zone or a no plant zone.

According to yet another aspect of the invention, a method of controlling downforce on a seeder implement is provided. The method includes sensing down force with a plurality of down force sensors associated with at least one section of the seeder implement such that each section of the seeder implement comprises at least one row unit and at least one down force sensor. The method further includes determining whether each of the at least one sections of the seeder implement is in a plant zone or a no plant zone. The method further includes controlling a plurality of down force actuators associated with row units on the seeder implement based at least partially on whether each of the at least one sections of the seeder implement is in a plant zone or a no plant zone.

According to another aspect of the invention, a control system for a seeder implement with a plurality of row units is provided. The control system includes an intelligent control, a plurality of down force sensors operatively connected to the intelligent control, and a plurality of down force actuators operatively connected to the intelligent control, each of the row units associated with at least one of the plurality of down force actuators. The intelligent control is configured to determine whether one or more of the row units is in a plant zone or a no plant zone and to control down force applied by the plurality of down force actuators differently when one or more of the plurality of row units is in a no plant zone.

DETAILED DESCRIPTION

The present invention provides for controlling down force in a row unit differently based upon when a row unit is in a no plant zone versus when it (or other row units) is in a plant zone. A "no plant zone" is defined to include field areas already planted and field areas spatially defined as a no crop zone.

Figure 1:
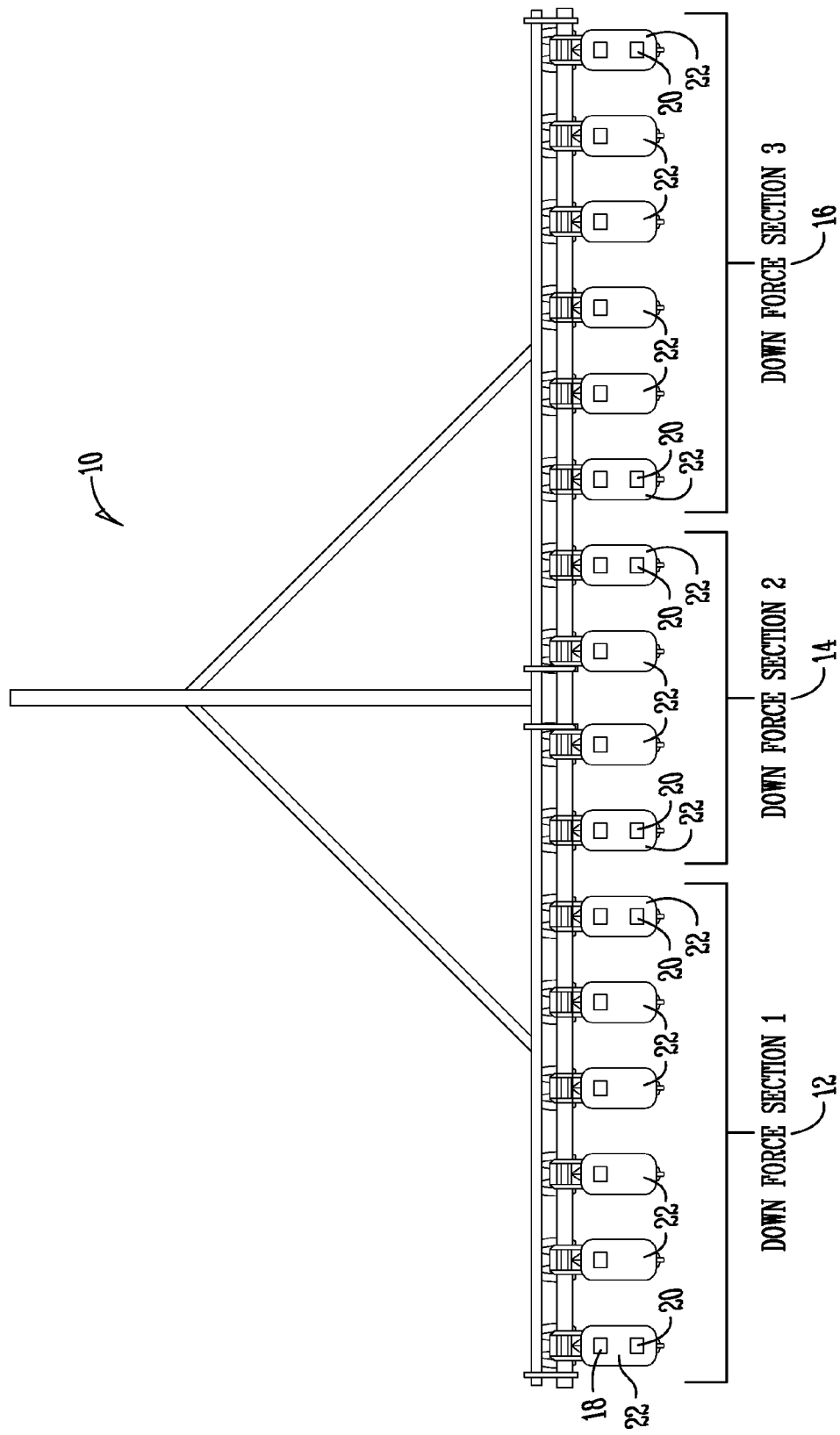
FIG. 1 is an example of a seeder implement.

FIG. 1 is an example of a Seeder implement 10. The seeder implement 10 includes three sections of down force control, including a first section 12, a second section 14, and a third section 16. Each control section 12, 14, 16, has two down force sensors 20 preferably on opposite ends of the section. As shown in FIG. 1 there is a 16 row planter with 16 row units 22 and each row unit has a down force actuator 18. The outer down force sections, which are the first section 12 and the third section 16 each have six row units 22 while the middle or second down force section 14 includes four row units 22.

Figure 2:
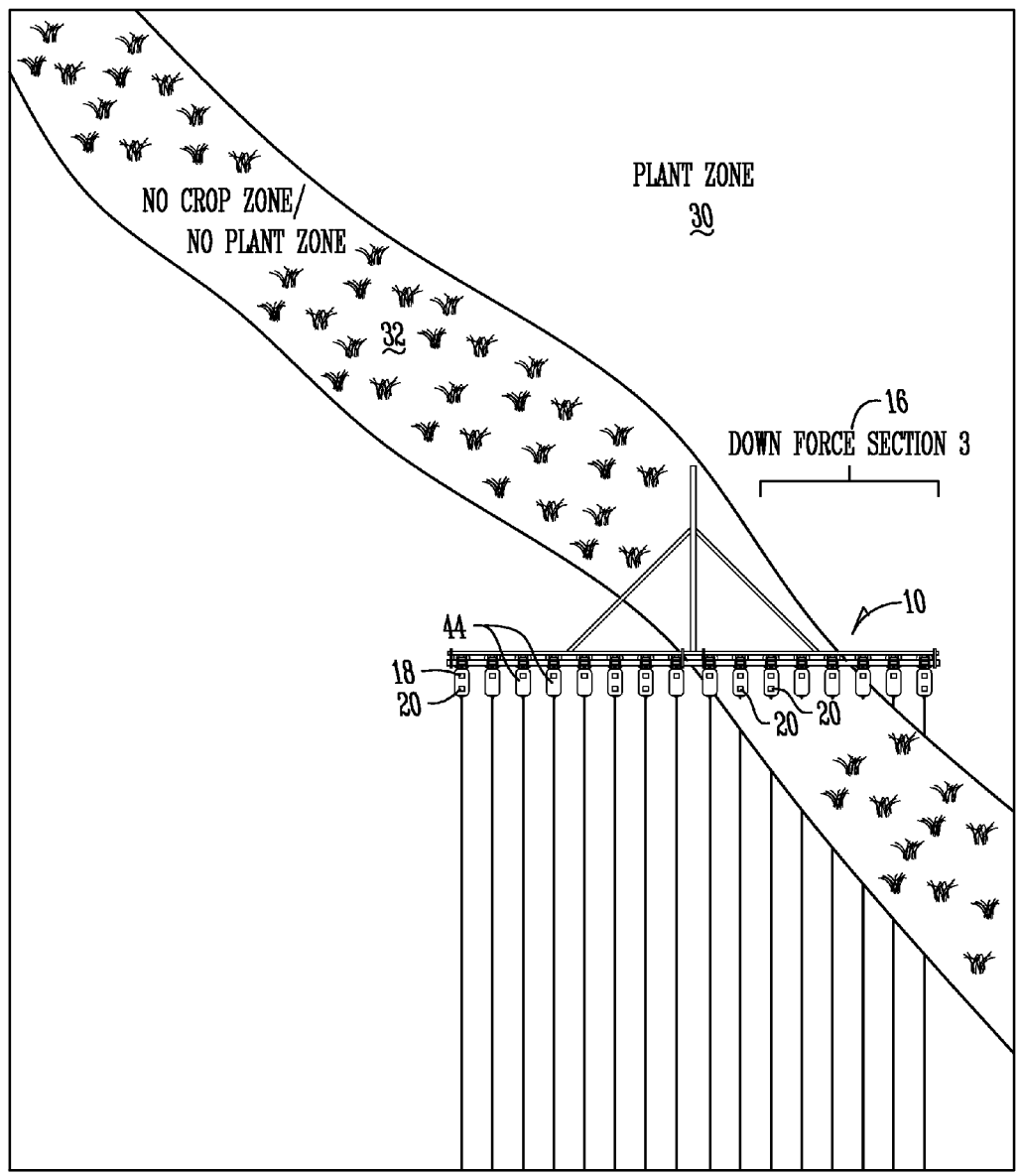
FIG. 2 illustrates an example of the seeder implement being used in a field with a plant zone and a no crop or no plant zone.

FIG. 2 illustrates an example of the seeder implement 10 being used in a field with a plant zone 30 and a no crop zone or no plant zone 32. Note that in one down force sensor of the third section 16 is in a no plant zone 32 while another down force sensor (the rightmost downforce sensor 20) is in a plant zone. The no plant zone 32 is a grassed waterway which is also defined as a no crop zone. The down force control system may ignore the down force sensor in the no plant zone making the down force actuators apply the correct down force for the rows over the plant zone. Alternatively, the system may suspend down force control for the whole section when any part of the down force control section is in the no plant zone.

Figure 3:
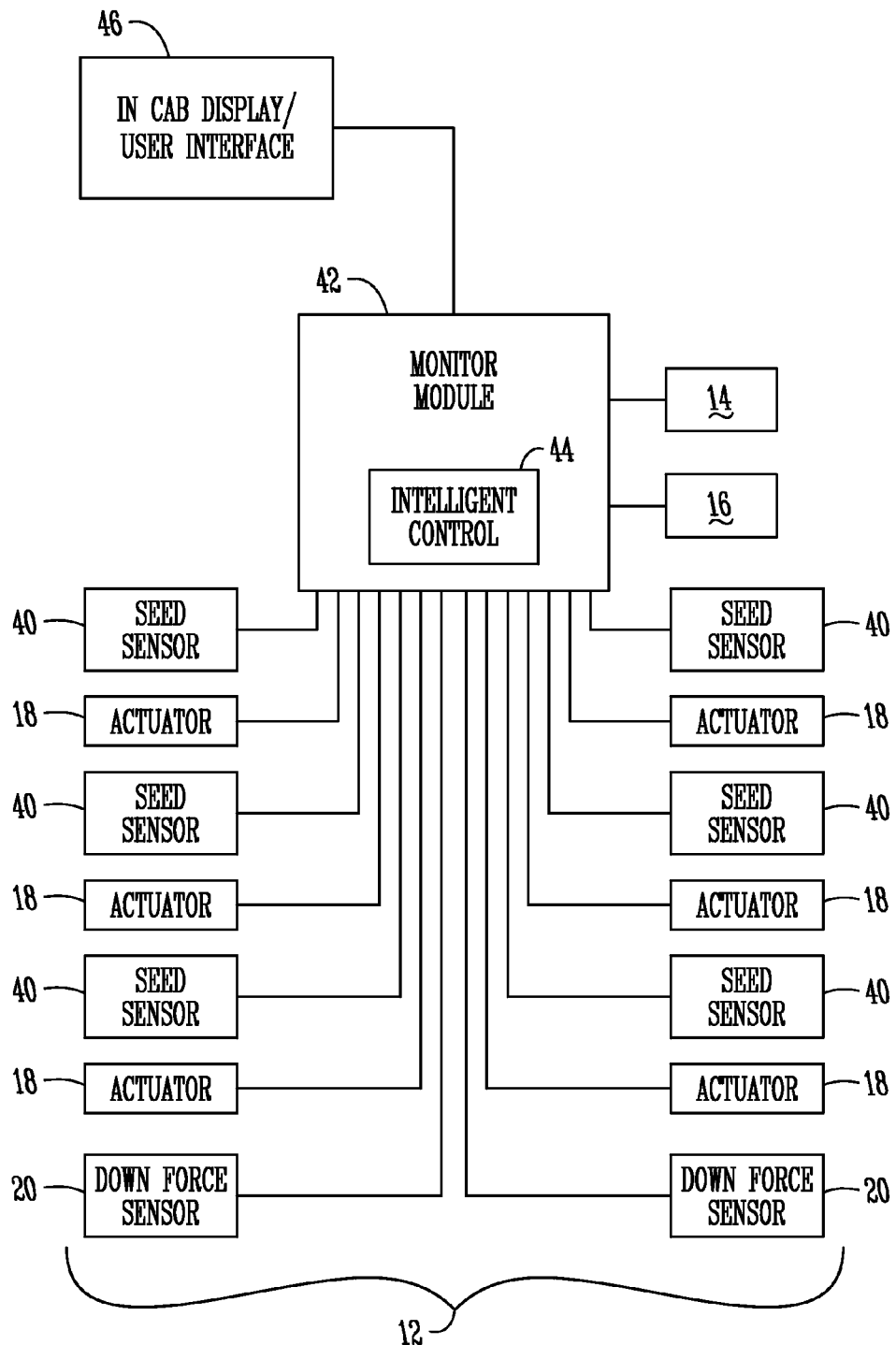
FIG. 3 illustrates the control system in additional detail.

FIG. 3 illustrates the control system in additional detail. As shown in FIG. 3, a monitor module 42 with an intelligent control 44 such as a processor, microcontroller, or other type of intelligent control. The monitor module 42 may provide for monitoring a plurality of different seed sensors 40 which are electrically connected to the monitor module 42 to sense that seeds are planted. In addition, the monitor module 42 may be electrically connected or otherwise operatively connected to the down force sensors 20 for each section 12, 14, 16 and actuators 18 for each row unit. The actuators 18 provide for pushing down on the row unit relative to the frame of the seeder implement 10 in a manner determined in part from signals sensed by the down force sensor 20. In addition, an in-cab display 46 may be electrically connected to the monitor module 42. The in-cab display/user interface may be used to display information related to the down force sensing. This can include information such as whether or not a down force section is in a plant zone or a no plant zone. In addition, the in-cab display 46 may be a touchscreen display or may provide for manual inputs or other user inputs which allow an operator to select settings or options.

Figure 4:
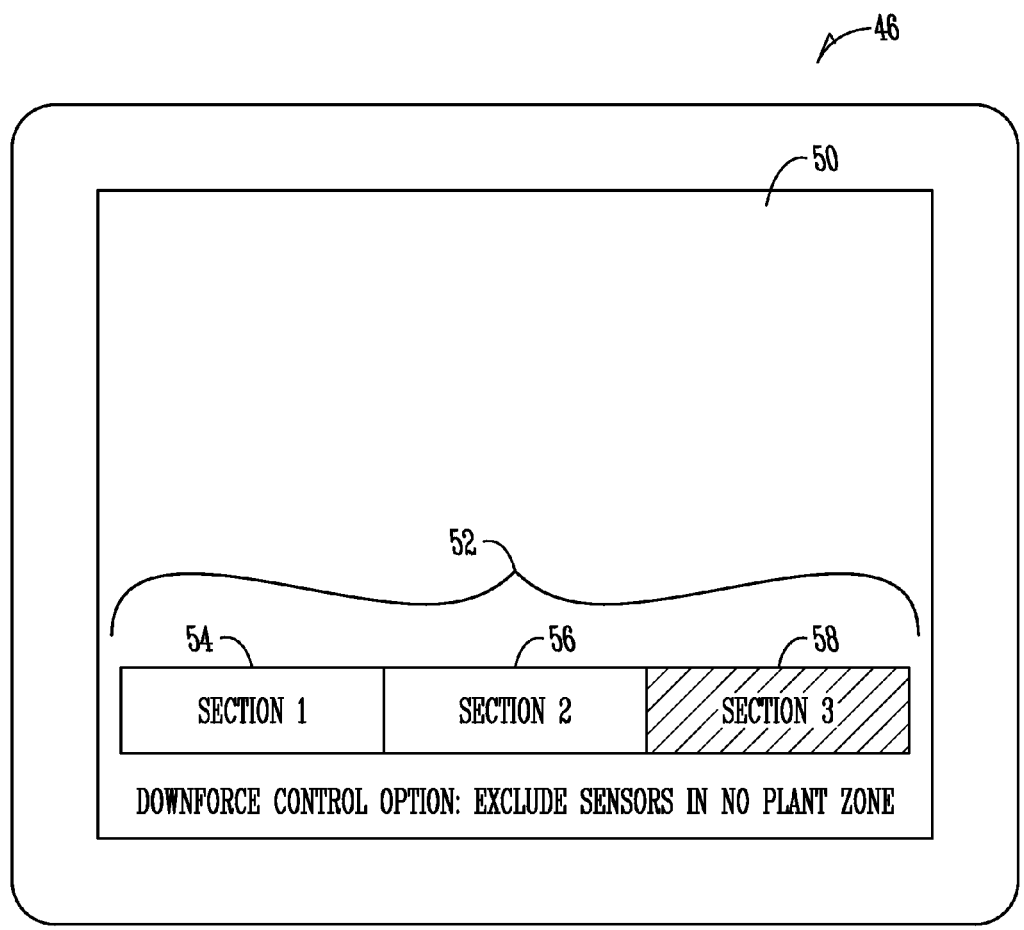
FIG. 4 illustrates one example of a screen display.

FIG. 4 illustrates one example of a screen display 50 on the display 46. As shown in FIG. 4, a graphical representation of the different down force sections 54, 56, 58 is shown. Note that the third section 58 is represented differently than the first two sections 54, 56 to show a different state. For example, the third section of the seeder implement may be in a no-plant zone and thus the screen display 50 indicates this state.

In addition, the downforce control options may be set from the display 46. Examples of downforce control options may include the option to exclude down force sensors that are spatially in a no plant zone from a logic routine used to command down force actuators. Another option is the option to suspend closed loop control whenever any part of a section is spatially in a no plant zone. Yet another option is to hold a down force actuator at its last down force adjustment. A further option is to remove all supplemental down force applied by the down force actuator.

The intelligent control may be programmed or otherwise configured to regulate downforce in any number of ways during normal operation. This may include maintaining downforce within a predetermined range, applying statistical methods to regulate downforce, or other types of algorithms to regulate downforce. As previously explained, the present invention provides for modifying the way in which downforce is regulated when one more sections of the seeder implement are in a no-plant zone.

Therefore, a control system for a seeder implement and related methods have been disclosed. The present invention contemplates numerous variations, options, and alternatives and is not to be limited to the specific embodiments described herein.

What is claimed is:

1. A control system for a seeder implement with a plurality of row units grouped into one or more sections, the control system comprising:
    an intelligent control;
    a plurality of down force sensors operatively connected to the intelligent control, each of the one or more sections having at least one down force sensor associated therewith;
    a plurality of down force actuators operatively connected to the intelligent control, each of the row units associated with at least one of the plurality of down force actuators;
    wherein the intelligent control is configured to determine Whether each of the one or more sections is in a plant zone or a no plant zone and to control down force applied by the plurality of down three actuators differently when one or more of the plurality of sections is in a no plant zone.

2. The control system of claim 1 wherein each of the at least one sections includes more than one down force sensor.

3. The control system of claim 1 wherein the intelligent control is configured to exclude use of the down force sensors spatially located within the no plant zone.

4. The control system of claim 1 wherein when one or more of the sections is in the no plant zone, the intelligent control is configured to exclude use of the down force sensors within the no plant zone.

5. The control system of claim 1 wherein when the one or more of the plurality of sections is in the no plant zone, the intelligent control is configured to suspend closed loop control of the down force actuators for the one or more of the sections in the no plant zone.

6. The control system of claim 1 wherein when the one or more sections is in the no plant zone, the intelligent control is configured to suspend closed loop control of the down force actuators for all of the sections.

7. The control system of claim 1 wherein when the one or more sections is in the no plant zone, the intelligent control is configured to maintain down force without adjustment for the one or more of the sections in the no plant zone.

8. The control system of claim 1 wherein when the one or more sections is in the no plant zone, the intelligent control is configured to maintain down force without adjustment for all of the sections.

9. The control system of claim 1 further comprising displaying on a display operatively connected to the intelligent control a screen display indicating whether one or more of the sections is in a no plant zone.

10. A seeder implement, comprising:
a plurality of row units;
at least one section, with each of the at least one section containing a subset of the plurality of row units;
a down force actuator associated with each of the plurality of row units;
at least one down force sensor associated with each of the at least one section;
an intelligent control operatively connected to each down force actuator and each down force sensor, the intelligent control configured to determine whether each section is in a plant zone or a no plant zone and to control down force based on whether each of the at least one section is in the plant zone or the no plant zone.

11. The seeder implement of claim 10 wherein when one or more of the plurality of sections is in the no plant zone, the intelligent control is configured to exclude use of the down force sensors within the no plant zone.

12. The seeder implement of claim 10 wherein when one or more of the plurality of sections is in the no plant zone, the intelligent control is configured to suspend closed loop control of the down force actuators for the one or more of the plurality of sections in the no plant zone.

13. The seeder implement of claim 10 wherein when one or more of the plurality of sections is in the no plant zone, the intelligent control is configured to suspend closed loop control of the down force actuators for all of the plurality of sections.

14. The seeder implement of claim 10 wherein when one or more of the plurality of sections is in the no plant zone, the intelligent control is configured to maintain down force without adjustment for the one or more of the plurality of sections in the no plant zone.

15. The seeder implement of claim 10 wherein when one or more of the plurality of sections is in the no plant zone, the intelligent control is configured to maintain down force without adjustment for all of the plurality of sections.

16. The seeder implement of claim 10 further comprising a display operatively connected to the intelligent control a screen display and adapted to indicate to an operator whether one or more of the plurality of sections is in a no plant zone.

17. A method of controlling downforce on a seeder implement, the method comprising:
sensing down force with one or more down force sensors associated with at least one section of the seeder implement such that each section of the seeder implement comprises at least one row unit and at least one down force sensor;
determining whether each of the at least one section of the seeder implement is in a plant zone or a no plant zone;
controlling a plurality of down force actuators associated with row units on the seeder implement based at least partially on whether each of the at least one section of the seeder implement is in a plant zone or a no plant zone.

18. The method of claim 17 wherein the step of controlling comprises applying a control algorithm which excludes use of down force sensors spatially located within the no plant zone.

19. The method of claim 17 wherein the step of controlling comprises suspending closed loop control of the plurality of down force actuators for sections of the seeder implement within the no plant zone.

20. The method of claim 17 wherein the step of controlling comprises suspending closed loop control of the plurality of down force actuators based at least partially on whether each of the at least one section of the seeder implement is in the plant zone or the no plant zone.

21. The method of claim 17 wherein the step of controlling comprises maintaining down force applied by the plurality of down force actuators without adjustment while one or more of the sections is in the no plant zone.

22. The method of claim 17 wherein the step of controlling comprises maintaining down force applied by the each of the plurality of down force actuators within one or more of the sections in the no plant zone without adjustment.

23. The method of claim 17 further comprising displaying a visual representation of whether each of the sections is in the plant zone or the no plant zone on a display.

24. A control system for a seeder implement with a plurality of row units, the control system comprising:
an intelligent control;
a plurality of down force sensors operatively connected to the intelligent control;
a plurality of down force actuators operatively connected to the intelligent control, each of the row units associated with at least one of the plurality of down force actuators;
wherein the intelligent control is configured to determine whether one or more of the row units is in a plant zone or a no plant zone and to control down force applied by the plurality of down force actuators differently when one or more of the plurality of row units is in a no plant zone.

25. The control system of claim 24 wherein the intelligent control is configured to suspend closed loop control of one or more of the plurality of down force actuators when one or more of the row units is in the no plant zone.

26. The control system of claim 24 wherein the intelligent control is configured to maintain down force applied by the down force actuators without adjustment while one or more of the row units is in the no plant zone.

27. The control system of claim 24 wherein the intelligent control is configured to determine whether a first group containing one or more of the row units is in the plant zone while a second group containing one or more of the row units is in the no plant zone and to control the first group differently than the second group.

* * * * *

UNITED STATES PATENT AND TRADEMARK OFFICE
CERTIFICATE OF CORRECTION

PATENT NO.       : 8,380,356 B1
APPLICATION NO.  : 13/494557
DATED            : February 12, 2013
INVENTOR(S)      : Roger R. Zielke et al.

Page 1 of 1

It is certified that error appears in the above-identified patent and that said Letters Patent is hereby corrected as shown below:

Column 4, Claim 1, line 51:
DELETE after down "three"
ADD after down --force--

Signed and Sealed this
Ninth Day of April, 2013

Teresa Stanek Rea
*Acting Director of the United States Patent and Trademark Office*